(12) United States Patent
Xu et al.

(10) Patent No.: US 11,784,815 B2
(45) Date of Patent: Oct. 10, 2023

(54) METHOD OF TIME-DELAY ENCRYPTION WITH KEYWORD SEARCH AND SYSTEM USING THE SAME

(71) Applicant: Huazhong University of Science and Technology, Wuhan (CN)

(72) Inventors: Peng Xu, Wuhan (CN); Yubo Zheng, Wuhan (CN); Tianyang Chen, Wuhan (CN); Hai Jin, Wuhan (CN); Wei Wang, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 315 days.

(21) Appl. No.: 17/444,613

(22) Filed: Aug. 6, 2021

(65) Prior Publication Data
US 2022/0255744 A1    Aug. 11, 2022

(30) Foreign Application Priority Data
Feb. 10, 2021    (CN) .......................... 202110186704.2

(51) Int. Cl.
H04L 29/06    (2006.01)
H04L 9/30     (2006.01)
G06F 16/903   (2019.01)
H04L 9/06     (2006.01)

(52) U.S. Cl.
CPC ...... *H04L 9/3073* (2013.01); *G06F 16/90335* (2019.01); *H04L 9/0618* (2013.01); *H04L 9/0643* (2013.01)

(58) Field of Classification Search
CPC ... H04L 9/3073; H04L 9/0618; H04L 9/0643; G06F 16/90335
See application file for complete search history.

(56) References Cited

U.S. PATENT DOCUMENTS

| | | | |
|---|---|---|---|
| 10,348,693 B2 * | 7/2019 | Auradkar | H04L 63/0428 |
| 2015/0207782 A1 * | 7/2015 | Hattori | G06F 21/6227 |
| | | | 713/168 |
| 2016/0227401 A1 * | 8/2016 | Otero | H04W 12/03 |
| 2019/0207763 A1 * | 7/2019 | Jin | H04L 9/0643 |
| 2019/0229906 A1 * | 7/2019 | Jin | H04L 9/14 |
| 2021/0194670 A1 * | 6/2021 | Tahir | H04L 9/0825 |

* cited by examiner

Primary Examiner — Malcolm Cribbs
(74) Attorney, Agent, or Firm — Michael Ye; Rimon Law

(57) ABSTRACT

A method for increasing the difficulty for attackers to launch keyword guessing attacks, which uses a time-delay encryption with a keyword search based on a public key that generates searchable ciphertexts and/or files ciphertexts for keywords of at least one file that uploaded by time-delay encryption from a cloud server. A system for implementing the method is also described.

9 Claims, 2 Drawing Sheets

METHOD OF TIME-DELAY ENCRYPTION WITH KEYWORD SEARCH AND SYSTEM USING THE SAME

This application claims the benefit of the Chinese Patent Applications No. CN 202110186704.2 filed on Feb. 10, 2021, which is hereby incorporated by reference as if fully set forth herein.

BACKGROUND OF THE INVENTION

1. Technical Field

The present invention relates to encryption and cloud storage, and more particularly to a method of time-delay encryption with keyword search and system using the same.

2. Description of Related Art

With the rapid development of cloud computing technologies, cloud service providers offer users with convenient and reliable services of storage and computation that meet the increasing data and service demands. Meanwhile, in order to ensure that data of users stored in the cloud keep confidential and available, searchable encryption technologies have been developed. Currently, there are two types of searchable encryption technologies, namely searchable symmetric-key encryption and searchable public-key encryption (SPE). Benefiting from the properties of the public key setting, SPE is naturally suitable for non-interactive storage and search between a sending party and a receiving party. However, SPE is inherently subject to keyword guessing attacks. Keyword guessing attacks are mainly launched in two ways. First, after the attacker obtain some trapdoor, since keyword space is small in a real-world scenario, the attacker may traverse the keyword space to generate a searchable ciphertext that is then tested together with the captured keyword search trapdoor, thereby obtaining the keyword corresponding to the keyword search trapdoor. The second way is that the attacker guesses all possible keywords and generates corresponding ciphertexts, which are then uploaded to a server. The attacker utilizes the server as an oracle machine for testing to observe whether the returned result answering the request of the user contains previously generated ciphertexts, thereby verifying the guesses.

In order to defend against keyword guessing attacks, it is necessary to have a secure channel between the server and the receiving to prevent any attacker from acquiring the trapdoor or the search result. However, building a secure channel requires considerable computation overheads and communication overheads. Therefore, many strategies for dealing with keyword guessing attacks without the need of a secure channel have been introduced. These strategies may be divided into four types: (1) assigning a trusted server/server set to limit implementation of the trapdoor test to the assigned server or server set, thereby blocking any external attacker from verifying their guesses about keywords; (2) fuzzy keyword search by increasing entropy of the keyword space, so that an attacker cannot get the exact keyword information according to a fuzzy trapdoor that is suspected to have been compromised; (3) requiring the sending party to embed its private key into the searchable ciphertext so that the ciphertext is unforgeable and only the searchable ciphertext generated by the sending party specified in the trapdoor is allowed to execute a trapdoor test; (4) requiring a user to engage a trusted authority to strictly conduct identification of users, so that not everyone can generate a searchable ciphertext.

For example, China Patent No. CN108599937B discloses a public-key encryption method supporting multi-keyword search, which is used for solving the technical problem of complex ciphertext keyword calculation process in the conventional multi-keyword searchable public-key encryption method, and comprises the following implementation steps: (1) setting public parameters by a trusted third party; (2) a data owner sets a keyword field, a keyword vector and a query format of a storage file; (3) the trusted third party computes and distributes the keys of the cloud storage server and the data sharer; (4) the data owner encrypts and sends the plaintext keywords in the plaintext keyword vector; (5) the data sharer computes and sends trapdoor information of the plaintext keywords in the plaintext keyword vector; (6) and the cloud storage server searches the ciphertext keywords in the ciphertext set and sends the searched ciphertext keywords to the data sharer.

However, the foregoing solutions generally based on optimistic premises, which are often unachievable in real-world environments. In use of the trusted server approach without a secure channel, the prerequisite is that the server is truly reliable. However, it is in reality very difficult to get a server that is completely reliable due to network attacks or interests. Even if the trusted body is extended into a set of servers and the trapdoor test is split to several parts that are conducted separately, it is difficult to ensure that no complicity would happen. Fuzzy keyword search necessitates beforehand determination of entropy of the keyword space. This somehow sacrifice flexibility for keyword selection. The strategy that asks the receiving party to control access through a trapdoor is also imperfect in terms of practicality as it is difficult for the receiving party to transcendentally know whether the sending party can be trusted, and it needs to build a separate trapdoor for every sending party, significantly increasing communication overheads. Additionally, the strategy about introducing a trusted authority to manage user identity and behavior tends to cause additional costs. Hence, how to simplify the transcendental requirements of particular constructions, and to design and implement SPE solutions suitable for real-world environments is a pressing need to be addressed.

The objective of the present invention is to solve the problems of the foregoing technical means for addressing keyword guessing attacks. By combining a trapdoor delay function and searchable public-key encryption, the present invention creates a framework of time-delay encryption with keyword search. In this framework, a user who wants to search only needs to generate and submit a trapdoor that is capable of time-delay verification to a cloud server, the cloud server then can execute a search, determine whether a ciphertext contains the corresponding keyword, and verify the delayed workload of the sending party. The whole process requires nothing special from the server and the keyword space, and does not need complicated identification and management. The time-consuming generation of the searchable ciphertext adds difficulty to attackers launching keyword guessing attacks, and thereby the present invention resists keyword guessing attacks to a certain extent. The present invention is suitable for applications of keyword search in the real world, with great practicality.

Further, since there is certainly discrepancy between the prior art comprehended by the applicant of this patent application and that known by the patent examiners and since there are many details and disclosures disclosed in literature and patent documents that have been referred by the applicant during the creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In order to solve the problems of existing knowledge, the present invention provides a method of time-delay encryption with keyword search, at least comprising: based on a public key PK, generating searchable ciphertexts $C_w$ and/or file ciphertexts for keywords w of at least one to-be-uploaded file by means of time-delay encryption and uploading the ciphertexts to a cloud server. It takes a certain time to compute the trapdoor delay function TDF during encryption at the sending end, thereby realizing time-delay encryption at the sending end. Sending at least one keyword search trapdoor $T_w$ generated for one said to-be-searched keyword w based on a private key SK to the cloud server. The present invention can compute the corresponding trapdoor delay function TDF in a short time through the secret trapdoor 7C, and further generate the keyword search trapdoor $T_w$, so that the keyword search trapdoor can be used in the keyword search process to check whether the generation of searchable ciphertext meets the delay requirements, at the same time, it does not affect the calculation efficiency of the receiving end. The present invention uses time-delay encryption to make the costs for attackers to launch attacks significantly higher than attack rewards, thereby forcing attackers to give up keyword-guessing attacks. Moreover, in the present invention, the delay request is inviolable to the sending end, and this gives the cloud server the opportunity to conduct verification using a keyword search trapdoor, thereby ensuring authenticity of verification on the sending end.

The cloud server based on the keyword search trapdoor $T_w$ performs search on all the searchable ciphertexts $C_w$ so as to obtain the corresponding searchable ciphertexts $C_w$, and determines the corresponding file ciphertexts based on the searched searchable ciphertexts $C_w$ and feeds the corresponding file ciphertexts to the receiving end. In the present invention, by verifying that the searchable ciphertext matches the trapdoor, it is ensured that the sending party when generating the searchable ciphertext obtains the same result of computation of the trapdoor delay function as that obtain by the receiving party when the receiving party generates the keyword search trapdoor. As it takes certain time overheads for the sending party to generate legitimate searchable ciphertexts, this means an attacker needs significantly increased time costs when launching keyword guessing attacks. Thereby, the present invention can effectively resist keyword guessing attacks without the need of building a dedicated secure channel; without the need of treating the cloud server as being completely trusted; without the need of prior knowledge about distribution of the keyword space; and without the need of strict authenticity management on users.

Preferably, the method of generating the searchable ciphertexts $C_w$ and/or the file ciphertexts at least comprises: generating the searchable ciphertext $C_w$ for every said keyword w of the at least one to-be-uploaded file based on the public key PK by means of time-delay encryption, and encrypting the to-be-uploaded file to generate the file ciphertext.

Preferably, the method of generating the searchable ciphertext $C_w$ for every said keyword w of the at least one to-be-uploaded file based on the public key PK at least comprises: selecting a random value $r \in \mathbb{Z}_q^*$, and setting $C_0 = g^r$; computing $\Delta = \text{TDF}(H_1(w), T)$, setting $C_1 = H_3(e(H_2(\Delta)^r, h))$; and generating the searchable ciphertext $C_w = (C_0, C_1)$ based on $C_0$ and $C_1$; wherein TDF denotes a trapdoor delay function, w denotes the keyword of the to-be-uploaded file, $H_1$ denotes a first cryptographic hash function, $H_2$ denotes a second cryptographic hash function, $H_3$ denotes a third cryptographic hash function, e denotes a bilinear mapping, h denotes a search public key, T denotes a public trapdoor for the trapdoor delay function, and g denotes a generator for an elliptic curve group $\mathbb{G}$.

Preferably, the method of generating at least one keyword search trapdoor $T_w$ for the to-be-searched keyword w based on the private key SK at least comprises: computing $\Delta = \text{TDF}(H_1(w), \pi)$; and generating the trapdoor $T_w = H_2(\Delta)^s$ for the keyword w; wherein TDF denotes the trapdoor delay function, w denotes the to-be-searched keyword, $H_1$ denotes the first cryptographic hash function, $H_2$ denotes the second cryptographic hash function, $\pi$ denotes a secret trapdoor of the trapdoor delay function, and s denotes a search private key.

Preferably, the method of performing keyword search on all the searchable ciphertexts $C_w$ based on the keyword search trapdoor $T_w$ at least comprises: retrieving all the searchable ciphertexts based on the received keyword search trapdoor $T_w$; and where the searchable ciphertext $(C_0, C_1)$ satisfies: $H_3(e(T_w, C_0)) = C_1$, determining that the searchable ciphertext $(C_0, C_1)$ is a searchable ciphertext that contains the keyword w.

Preferably, the method further comprises: setting initialization parameters, which includes: building the corresponding bilinear mapping and the trapdoor delay function based on a preset security parameter and a delay time parameter, and computing the public key PK and the private key SK according to the parameters of the trapdoor delay function and the bilinear mapping.

Preferably, the method of setting the initialization parameters further comprises: building the bilinear mapping e: $\mathbb{G} \times \mathbb{G} \to \mathbb{G}_T$ based on the preset security parameter k, where the groups $\mathbb{G}$ and $\mathbb{G}_T$ denote elliptic curve groups, and the length of the order q of the two elliptic curve groups is equal to the security parameter k; building the trapdoor delay function TDF: $\mathcal{X} \times \{T, \pi\} \to \mathcal{Y}$ based on the preset delay time parameter t, and determining the public trapdoor T, computing the secret trapdoor $\pi$ of the trapdoor delay function based on the public trapdoor T; randomly selecting a generator g in the elliptic curve group G, selecting a random value $s \in \mathbb{Z}_q^*$ as the search private key, setting search public key $h = g^s$; and selecting three cryptographic hash functions:

$$H_1: \{0,1\}^* \to \mathcal{X}, H_2: \mathcal{Y} \to \mathbb{G}, H_3: \mathbb{G}_T \to \{0,1\}^k.$$

The present invention further provides a system of time-delay encryption with keyword search, at least comprising: based on a public key PK, the sending end generates searchable ciphertexts $C_w$ and/or file ciphertexts for keywords w of at least one to-be-uploaded file by means of time-delay encryption and uploading the ciphertexts to a cloud server; the receiving end sends at least one keyword search trapdoor $T_w$ generated for one said to-be-searched keyword w based on a private key SK to the cloud server; and the cloud server, based on the keyword search trapdoor $T_w$ performing keyword search on all the searchable ciphertexts $C_w$ so as to obtain the corresponding searchable ciphertexts $C_w$, and determining the corresponding file ciphertexts based on the searched searchable ciphertexts $C_w$ and feeding the corresponding file ciphertexts to a receiving end.

Preferably, the sending end generates the searchable ciphertext $C_w$ for every said keyword w of the at least one to-be-uploaded file based on the public key PK at least comprises: selecting a random value $r \in \mathbb{Z}_q^*$, and setting $C_0 = g^r$; computing $\Delta = TDF(H_1(w), T)$, setting $C_1 = H_3(e(H_2(\Delta)^r, h))$; and generating the searchable ciphertext $C_w = (C_0, C_1)$ based on $C_0$ and $C_1$; wherein TDF denotes a trapdoor delay function, w denotes the keyword of the to-be-uploaded file, $H_1$ denotes a first cryptographic hash function, $H_2$ denotes a second cryptographic hash function, $H_3$ denotes a third cryptographic hash function, e denotes a bilinear mapping, h denotes a search public key, T denotes a public trapdoor for the trapdoor delay function, and g denotes a generator for an elliptic curve group $\mathbb{G}$.

Preferably, the receiving end generates at least one keyword search trapdoor $T_w$ for the to-be-searched keyword w based on the private key SK at least comprises: computing $\Delta = TDF(H_1(w), \pi)$; and generating the trapdoor $T_w = H_2(\Delta)^s$ for the keyword w; wherein TDF denotes the trapdoor delay function, w denotes the to-be-searched keyword, $H_1$ denotes the first cryptographic hash function, $H_2$ denotes the second cryptographic hash function, $\pi$ denotes a secret trapdoor of the trapdoor delay function, and s denotes a keyword search private key.

In contrast with the shortcomings of the prior art, the present invention can be embodied without the need of building a dedicated secure channel; without the need of treating the cloud server as being completely trusted; without the need of prior knowledge about distribution of the keyword space; and without the need of strict authenticity management on users. All these make the present invention more suitable for real-world applications. With introduction of time delay during generation of searchable ciphertexts, the present invention significantly increases the costs for attackers to launch keyword guessing attacks, thereby effectively dealing with keyword guessing attacks.

DETAILED DESCRIPTION OF THE INVENTION

The following description details the present invention with reference to the accompanying drawings.

The present invention provides a method of time-delay encryption with keyword search and system using the same, also referred to as a method of time-delay encryption with keyword search and device using the same.

As used herein, the term "searchable ciphertext" refers to a ciphertext capable of executing search operations.

Embodiment 1

Figure 1:
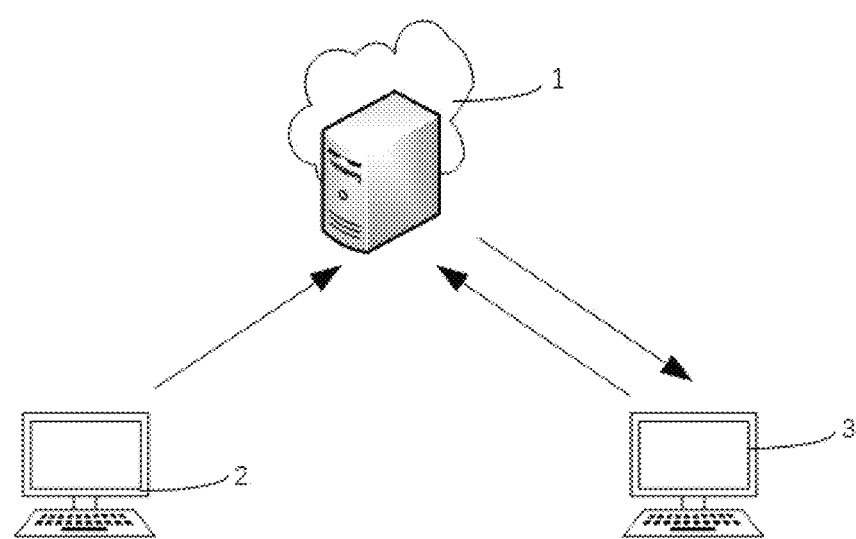
FIG. 1 is a schematic applied view of a system of time-delay encryption with keyword search according to the present invention.

As shown in FIG. 1, the system of time-delay encryption with keyword search of the present invention at least comprising a cloud server 1, a sending end 2, and a receiving end 3. The sending end 2 and the receiving end 3 are in communicative connection with cloud server, respectively, in a wired or wireless way.

The sending end 2 and the receiving end 3 may each be a desktop computer, a server, a portable computer, a smart phone, a tablet computer, a wearable device or any device capable of communication and transmission of information.

The sending end 2 sends at least one searchable ciphertext and/or file ciphertext A1 to the cloud server 1.

The receiving end 3 sends at least one search request A2 containing keyword search trapdoor information to the cloud server 1.

The cloud server 1, based on the keyword search trapdoor information, searches for second searchable ciphertexts that meets search criteria from pre-stored first searchable ciphertexts, and feeds file ciphertexts A3 corresponding to the second searchable ciphertexts to the receiving end 3.

The disclosed system of time-delay encryption with keyword search eliminates the need of building a secure channel between the user and the cloud server, the need of treating the cloud server as being completely trusted, the need of prior knowledge about distribution of the keyword space, and the need of strict authenticity management on users. Compared to the known solutions to keyword guessing attacks, the present invention better meets the needs of real-world applications.

The process executed by the sending end 2 includes:
based on public key PK, generating the searchable ciphertext $C_w$ for the keyword w of at least one to-be-uploaded file, and encrypting the to-be-uploaded file so as to generate a file ciphertext.

Preferably, the sending end 2, based on the public key PK, generates a searchable ciphertext $C_w$ for the keyword w for every to-be-uploaded file.

The sending end 2 uploads the generated searchable ciphertext and/or file ciphertext to the cloud server 1.

The process executed by the receiving end 3 includes:
based on the private key SK generating the keyword search trapdoor $T_w$ for the to-be-searched keyword w, and submitting the keyword search trapdoor to the cloud server 1.

The process executed by the cloud server 1 includes:
based on the keyword search trapdoor $T_w$ sent by the receiving end 3, searching all searchable ciphertexts to find out the corresponding searchable ciphertexts, and further returning the corresponding file ciphertexts to the receiving end 3.

Preferably, before the sending end 2 sends the searchable ciphertext and/or file ciphertext A1 to the cloud server 1, the cloud server 1, the sending end 2, and the receiving end 3 execute the processes as set by the initialization parameters.

The present invention uses a public trapdoor for encryption, and realizes the effects of delay by the feature that computing the trapdoor delay function TDF needs preset time cost. Furthermore, in the present invention, the receiving end uses a secret trapdoor to compute the trapdoor delay function TDF and generate a keyword search trapdoor. As it takes only a short time to compute the same result, the user experience at the receiving end is not compromised.

Preferably, the initialization parameters set the processes through the following steps.

S11 involves based on a preset security parameter k, building a bilinear mapping e: $\mathbb{G} \times \mathbb{G} \to \mathbb{G}_T$, wherein groups $\mathbb{G}$ and $\mathbb{G}_T$ are elliptic curve groups and the length of the order q of the two elliptic curve groups is equal to the security parameter k.

S12 involves based on preset delay time parameter t building a trapdoor delay function TDF: $\mathcal{X} \times \{T,\pi\} \to \mathcal{Y}$. Therein, the public trapdoor T of the trapdoor delay function is determined by the delay time parameter t. The secret trapdoor π of the trapdoor delay function is obtained through computation of the public trapdoor T.

Therein, the domain of function $\mathcal{X}$, $\{T,\pi\}$ and the range $\mathcal{Y}$ are associated with the particular construction of the trapdoor delay function.

The public trapdoor T and the secret trapdoor π are in one-to-one correspondence. For example, the public trapdoor T and the secret trapdoor π comes in a pair.

Except for the receiving end that built TDF, no one can derive the secret trapdoor π according to the public trapdoor T. Meanwhile, by using the secret trapdoor, the trapdoor delay function TDF can be easily obtained through computation. This saves computation time and thereby maintain good user experience at the receiving end. Moreover, the time overheads associated with using the public trapdoor to figure out TDF are significant, and the effect of parallel acceleration can be ignored. For a TDF instance, for $\forall x \in \mathcal{X}$, TDF(x,T)=TDF(x,π) always holds. This eliminates the needs of a secure channel between the cloud server and the sending end/the receiving end. Instead, only verification of the trapdoor delay function is sufficient to whether the process for the sending end to generate the searchable ciphertext takes at least the time overheads as set at the receiving end during initialization.

Preferably, the trapdoor delay function TDF may be constructed based on a ring of residue classes modulo-N.

Preferably, building the trapdoor delay function TDF is achieved through:

according to a preset delay time parameter t, building a ring of residue classes modulo-N $\mathbb{Z}_N^*$, where N=P, Q, and P, Q are each a big prime number;

according to the delay time parameter t, determining the public trapdoor T, and computing φ(N)=(P-1)(Q-1), then the secret trapdoor $\pi = 2^T \bmod \varphi(N)$.

The trapdoor delay function TDF is denoted as: $\forall x \in \mathbb{Z}_N^*$, $TDF(x,T) = x^{2^T} \bmod N \in \mathbb{Z}_N^*$ and $TDF(x,\pi) = x^\pi \bmod N \in \mathbb{Z}_N^*$.

According to Euler's number φ(N) and the computational rules of $\mathbb{Z}_N^*$, $x^{2^T} \bmod N = x^{2^T \bmod \varphi(N)} \bmod N = x^\pi \bmod N$, i.e., TDF(x,T)=TDF(x,π). Prime factorization for a big integer N is known to be difficult. Therefore, it is hard to get the secret trapdoor TC according to N and T. Where there is only the public trapdoor T given, computation of TDF requires T times of serial execution of square operation of modulo-N. The time overheads are huge and thus satisfy the requirement set by the predetermined delay time parameters. Additionally, for computation of TDF, the effect of parallel acceleration can be ignored.

S13 involves randomly selecting a generator g in the elliptic curve group G, and selecting a random value s e $V_q$, setting $h = g^s$. Three cryptographic hash functions are selected:

$H_1: \{0,1\}^* \to \mathcal{X}, H_2: \mathcal{Y} \to \mathbb{G}, H_3: \mathbb{G}_T \to \{0,1\}^k$.

In S14, based on the bilinear mapping e, the trapdoor delay function TDF, the generator g of the elliptic curve group $\mathbb{G}$ and the three cryptographic hash functions, the public key PK and the private key SK: PK=(q, $\mathbb{G}$, $\mathbb{G}_T$, e, g, h, TDF, T, $H_1, H_2, H_3$), SK=(s,π) are generated.

After the receiving end performs initialization, the receiving end sends public information to the cloud server. The sending end may access the public information from the cloud server.

For example, the receiving end initializes a set of parameters. The sending end according to the public information acquired from the cloud server generates the searchable ciphertext in a delayed manner. Since the sending end is blocked from the secret trapdoor for the trapdoor delay function TDF, it takes a long time period for the sending end to do computation for the trapdoor delay function TDF, thereby achieving time-delay encryption.

The receiving end based on the secret information after initialization generates the keyword search trapdoor. The keyword search trapdoor can verify "whether the sending end generates the searchable ciphertext with required delay." The receiving end possesses the TDF secret trapdoor, so the time it spends on the trapdoor delay function TDF is relatively short.

Preferably, in the process executed by the sending end 2, generating the searchable ciphertext $C_w$ involves the following sub-processes:

S21: selecting random value $r \in \mathbb{Z}_q^*$, setting $C_0 = g^r$;

S22: computation $\Delta = TDF(H_1(w),T)$, setting $C_1 = H_3(e(H_2(\Delta)^r, h))$;

S23: based on $C_0$ and $C_1$ generate searchable ciphertext $C_w = (C_0, C_1)$.

In the present invention, the sending end 2 generates the searchable ciphertext with time delay, and this increases the costs for attackers to launch keyword guessing attacks, thereby effectively dealing with keyword guessing attacks.

During generation of the searchable ciphertext, computation on the trapdoor delay function TDF causes delay. In other words, the process of computing $\Delta = TDF(H_1(w),T)$ is quite time-consuming. According to the definition and functional requirements of the trapdoor delay function TDF, when there is only the public trapdoor T being known, the time overheads for computation of TDF are significant and the effect of parallel acceleration can be ignored. The time overheads meet the requirements of preset delay time parameters. Although TDF can be easily obtained using the secret trapdoor π, no one other than the builder of TDF can obtain the secret trapdoor π according to the public information. Therefore, malicious users and attackers are blocked from fast computation of TDF, or, they are unable to shorten the time required by the generation of the searchable ciphertext.

Preferably, in the process executed by the receiving end 3, generating the keyword search trapdoor $T_w$ for the to-be-searched keyword w based on the private key SK comprises the following sub-processes:

S41: computing $\Delta = TDF(H_1(w),\pi)$;

S42: generating the trapdoor $T_w = H_2(\Delta)^s$ of the keyword w; and

S43: initiating a search request to the cloud server 1, namely uploading the trapdoor $T_w$ to the cloud server 1.

In the present invention, the trapdoor generated by the receiving end 3 is capable of delay verification. According to the definition of the trapdoor delay function, for the same keyword w, $TDF(H_1(w),T) = TDF(H_1(w),\pi)$ always holds. Therefore, the present invention can ensure that generation of the searchable ciphertext matching the trapdoor during the search stage always takes predetermined time overheads for computation of $TDF(H_1(w),T)$.

Preferably, the cloud server 1 based on the keyword search trapdoor $T_w$ searching all searchable ciphertexts comprises the following sub-processes.

S51 involves based on the received keyword search trapdoor $T_w$ searching all searchable ciphertexts. Where the searchable ciphertext $(C_0,C_1)$ satisfies: $H_3(e(T_w,C_0))=C_1$, it is determined that the searchable ciphertext is the one containing the keyword w. Generation of the searchable ciphertext must take the predetermined time overheads for computation of $TDF(H_1(w),T)$.

The cloud server determines whether the "keyword search trapdoor" matches the "searchable ciphertext." During this process, the cloud server does not know the value of the trapdoor delay function TDF.

It is determined that the "keyword search trapdoor" matches the "searchable ciphertext" when:

(1) the two share the same keyword; and (2) during generation, the computed values of the trapdoor delay function TDF for the two are the same.

Instead of getting the trapdoor delay function TDF through "efficient/easy" computation, the sending end has to spend a predetermined time period to generate the searchable ciphertext. This period is determined by the delay time parameters used at the receiving end during initialization.

In S52, the searched corresponding file ciphertexts are returned to the receiving end 3.

Embodiment 2

As the present embodiment is made for further illustrating Embodiment 1, repeated description is omitted herein for conciseness.

Figure 2:
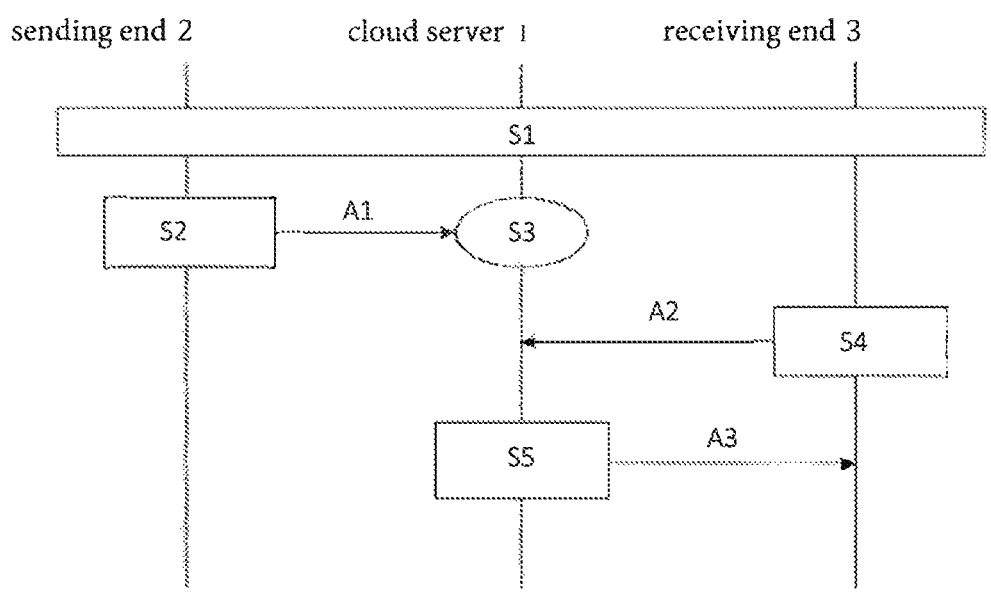
FIG. 2 is a block diagram showing the flow of a method of time-delay encryption with keyword search according to the present invention.

As shown in FIG. 2, the method of time-delay encryption with keyword search implemented by the disclosed time-delay encryption with keyword search system at least comprises the following steps.

S1 involves according to the preset security parameters and the delay time parameters building the corresponding bilinear mapping and the trapdoor delay function, and according to the bilinear mapping and the parameters of the trapdoor delay function to compute the public key PK and the private key SK.

S2 involves based on the public key PK, generating at least one searchable ciphertext $C_w$ for the keyword w of at least one to-be-uploaded file. The to-be-uploaded file is encrypted to generate a file ciphertext, and at last the generated searchable ciphertext and/or file ciphertext is uploaded to the cloud server 1.

In S3, the cloud server 1 receives and stores the searchable ciphertext and the file ciphertext.

S4 involves based on the private key SK, generating the keyword search trapdoor $T_w$ for the to-be-searched keyword w, and sending the keyword search trapdoor to the cloud server 1.

S5 involves based on the keyword search trapdoor searching all searchable ciphertexts, and returning the receiving end 3 with the file ciphertexts that meet the criteria.

The cloud server 1, based on the received keyword search trapdoor $T_w$, searches for all searchable ciphertexts to identify the corresponding searchable ciphertexts, and further returns the corresponding file ciphertexts to the receiving end 3.

Preferably, the step S2 further comprises:

based on the public key PK, generating at least one searchable ciphertext $C_w$ for the keyword w of every to-be-uploaded file.

By introducing time delay to the process of generation of the searchable ciphertext, the present invention increases the costs for attackers to launch keyword guessing attacks, thereby effectively dealing with keyword guessing attacks.

Preferably, before the ciphertext is uploaded, the cloud server, the sending end, and the receiving end may initialize the system and set various parameters for the system. In other words, the step S1 realizes setting of initialization parameters of the system.

The detailed process of initialization of the system comprises the following steps.

S11 involves based on a preset security parameter k, building a bilinear mapping e: $\mathbb{G} \times \mathbb{G} \to \mathbb{G}_T$, wherein groups $\mathbb{G}$ and $\mathbb{G}_T$ are elliptic curve groups and the length of the order q of the two elliptic curve groups is equal to the security parameter k.

S12 involves based on preset delay time parameter t building a trapdoor delay function TDF: $\mathcal{X} \times \{T,\pi\} \to \mathcal{Y}$. Therein, the public trapdoor T of the trapdoor delay function is determined by the delay time parameter t. The secret trapdoor $\pi$ of the trapdoor delay function is obtained through computation of the public trapdoor T.

Therein, the domain of function $\mathcal{X}$, $\{T,\pi\}$ and the range $\mathcal{Y}$ are associated with the particular construction of the trapdoor delay function.

The public trapdoor T and the secret trapdoor $\pi$ are in one-to-one correspondence. For example, the public trapdoor T and the secret trapdoor $\pi$ comes in a pair.

Except for the receiving end that built TDF, no one can derive the secret trapdoor $\pi$ according to the public trapdoor T. Meanwhile, by using the secret trapdoor, the trapdoor delay function TDF can be easily obtained through computation. This saves computation time and thereby maintain good user experience at the receiving end. Moreover, the time overheads associated with using the public trapdoor to figure out TDF are significant, and the effect of parallel acceleration can be ignored. For a TDF instance, for $\forall x \in \mathcal{X}$, $TDF(x,T)=TDF(x,\pi)$ always holds. This eliminates the needs of provide a secure channel between the cloud server and the sending end/the receiving end. Instead, only verification of the trapdoor delay function is sufficient to whether the process for the sending end to generate the searchable ciphertext takes at least the time overheads as set at the receiving end during initialization.

Preferably, trapdoor delay function TDF can be constructed based on a ring of residue classes modulo-N.

Preferably, building the trapdoor delay function TDF comprises:

according to a preset delay time parameter t building a ring of residue classes modulo-N $\mathbb{Z}_N^*$, where N=P Q, and P, Q are each a big prime number;

according to the delay time parameter t determining the public trapdoor T, computing $\varphi(N)=(P-1)(Q-1)$, then the secret trapdoor $\pi=2^T \bmod \varphi(N)$; and denoting the trapdoor delay function TDF as: $\forall x \in \mathbb{Z}_N^*$, $TDF(x,T)=x^{2^T} \bmod N \in \mathbb{Z}_N^*$ and $TDF(x,\pi)=x^\pi \bmod N \in \mathbb{Z}_N^*$.

According to Euler's number $\varphi(N)$ and the computational rules of $Z_N^*$, $x^{2^T} \bmod N = x^{2^T \bmod \varphi(N)} \bmod N = x^\pi \bmod N$, i.e., $TDF(x,T)=TDF(x,\pi)$. Prime factorization for a big integer N is known to be difficult. Therefore, it is hard to get the secret trapdoor TC according to N and T. Where there is only the public trapdoor T given, computation of TDF requires T times of serial execution of square operation of modulo-N.

The time overheads are huge and thus satisfy the requirement set by the predetermined delay time parameters. Additionally, for computation of TDF, the effect of parallel acceleration can be ignored.

S13 involves randomly selecting a generator g in the elliptic curve group $\mathbb{G}$, and selecting a random value $s \in \mathbb{Z}_q^*$, setting $h=g^s$. Three cryptographic hash functions are selected: $H_1: \{0,1\}^* \to \mathcal{X}$, $H_2: \mathcal{Y} \to \mathbb{G}$, $H_3: \mathbb{G}_T \to \{0,1\}^k$.

S14 involves, according to the results of the previous steps S11, S12 and S13, generating the public key PK and the private key SK: $PK=(q, \mathbb{G}, \mathbb{G}_T, e, g, h, TDF, T, H_1, H_2, H_3)$, $SK=(s,\pi)$.

S2 is about generating the ciphertext using time-delay encryption.

Generating the ciphertext comprises the following steps:

S21: selecting a random value $r \in \mathbb{G}_q^*$;

S22: computing $\Delta=TDF(H_1(w),T)$, setting $C_1=H_3(e(H_2(\Delta)^r,h))$;

S23: according to the results of S21 and S22, generating the searchable ciphertext $C_w=(C_0,C_1)$ of keyword w;

S24: encrypting the to-be-uploaded file to obtain the file ciphertext, and uploading the searchable ciphertext and the file ciphertext to the cloud server.

S3: the cloud server receives and stores the searchable ciphertext and the file ciphertext uploaded by the sending end.

S4: generate keyword search trapdoor and initiate search request.

Generating the keyword search trapdoor is specifically achieved through:

S41: computing $\Delta=TDF(H_1(w),\pi)$;

S42: according to the result of S41, generating the trapdoor $T_w=H_2(\Delta)^s$ of keyword w; and S43: the receiving end uploads the trapdoor $T_w$ to the cloud server, namely initiating a search request.

In the present invention, the receiving end generates and sends the trapdoor capable of verification of time delay to the cloud server, for the cloud server to execute search and determine whether the ciphertext contains the corresponding keyword and verify the workload of the sending party. According to the definition of the trapdoor delay function, for the same keyword w, $TDF(H_1(w),T)=TDF(H_1(w),\pi)$ always holds. Thus, it can be ensured that the generation of the searchable ciphertext matching the trapdoor at the search stage always takes the predetermined time overheads for computation of $TDF(H_1(w),T)$.

S5: searching ciphertexts and returning results.

Searching ciphertexts is achieved through the following steps.

In S51, the cloud server uses the received keyword search trapdoor $T_w$ to search all searchable ciphertexts, and if the searchable ciphertext $(C_0,C_1)$ satisfies: $H_3(e(T_w,C_0))=C_1$, determines that this is a searchable ciphertext containing the keyword w. Therein, generation of the matching searchable ciphertext at least costs the time overheads set at the receiving end during initialization, and this significantly increases the costs for attackers to launch keyword guessing attacks, thereby effectively dealing with keyword guessing attacks.

In S52, the cloud server according to the found searchable ciphertexts, returns the corresponding file ciphertexts to the receiving end.

During communication among the cloud server 1, the sending end 2 and the receiving end 3, the present invention has no special requirements for servers and distributions of keyword space, and does not need complicated identification and management. Therefore, the present invention eliminates the need of building a secure channel between the user and the cloud server, the need of treating the cloud server as being completely trusted, the need of prior knowledge about the distribution of the keyword space, and the need of strict authenticity management on users. Compared to the known solutions to keyword guessing attacks, the present invention is more suitable for applications of keyword search in real-world environments and provides great practicality.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not come off the concept of the present invention should be encompassed by the appended claims.

The description of the present invention contains a number of inventive concepts, and the applicant reserves the right to file a divisional application based on each of the inventive concepts. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A method of time-delay encryption with keyword search, at least comprising:

based on a public key PK, generating searchable ciphertexts $C_w$ for keywords w of at least one to-be-uploaded file by means of time-delay encryption and uploading the ciphertexts to a cloud server;

sending at least one keyword search trapdoor Tw generated for one said keyword w to-be-searched based on a private key SK to the cloud server; and the cloud server, based on the keyword search trapdoor $T_w$ performing keyword search on all the searchable ciphertexts $C_w$, so as to obtain the corresponding searchable ciphertexts $C_w$, and determining the corresponding file ciphertexts based on the searched searchable ciphertexts Cw and feeding the corresponding file ciphertexts to a receiving end, wherein generating the searchable ciphertexts $C_w$ for every said keyword w of the at least one to-be-uploaded file based on the public key PK at least comprises:

selecting a random value $r \in \mathbb{Z}_q^*$, and setting $C_0=g^r$;

computing $\Delta=TDF(H_1(w),T)$, setting $C_1=H_3(e(H_2(\Delta)^r,h))$; and generating the searchable ciphertext $C_w=(C_0,C_1)$ based on $C_0$ and $C_1$;

wherein TDF denotes a trapdoor delay function, w denotes the keyword of the to-be-uploaded file, $H_1$ denotes a first cryptographic hash function, $H_2$ denotes a second cryptographic hash function, $H_3$ denotes a third cryptographic hash function, e denotes a bilinear mapping, h denotes a search public key, T denotes a public trapdoor for the trapdoor delay function, and g denotes a generator for an elliptic curve group $\mathbb{G}$.

2. The method of claim 1, wherein generating the searchable ciphertexts C and/or the file ciphertexts at least comprises:

generating the searchable ciphertexts $C_w$ every said keyword w of the at least one to-be-uploaded file based on the public key PK by means of time-delay encryption, and encrypting the to-be-uploaded file to generate the file ciphertexts.

3. The method of claim 1, wherein generating at least one keyword search trapdoor $T_w$ for the to-be-searched keyword w based on the private key SK at least comprises:
computing $\Delta = TDF(H_1(w), \pi)$; and
generating the trapdoor $T_w = H_2(\Delta)^s$ for the keyword w;
wherein TDF denotes the trapdoor delay function, w denotes the to-be-searched keyword, $H_1$ denotes the first cryptographic hash function, $H_2$ denotes the second cryptographic hash function, $\pi$ denotes a secret trapdoor of the trapdoor delay function, and s denotes a search private key.

4. The method of claim 3, wherein performing keyword search on all the searchable ciphertexts $C_w$ based on the keyword search trapdoor $T_w$ at least comprises:
retrieving all the searchable ciphertexts based on the received keyword search trapdoor $T_w$; and
where the searchable ciphertext $(C_0, C_1)$ satisfies: $H_3(e(T_w, C_0)) = C_1$, determining that the searchable ciphertext $(C_0, C_1)$ is a searchable ciphertext that contains the keyword w.

5. The method of claim 4, further comprising setting initialization parameters, which includes:
building the corresponding bilinear mapping and the trapdoor delay function based on a preset security parameter and a delay time parameter, and computing the public key PK and the private key SK according to the parameters of the trapdoor delay function and the bilinear mapping.

6. The method of claim 5, wherein setting the initialization parameters further comprises:
building the bilinear mapping $e: \mathbb{G} \times \mathbb{G} \to \mathbb{G}_T$ based on the preset security parameter k, where the groups $\mathbb{G}$ and $\mathbb{G}_T$ denote elliptic curve groups, and the length of the order q of the two elliptic curve groups is equal to the security parameter k;

building the trapdoor delay function TDF: $\mathcal{X} \times \{T, \pi\} \to \mathcal{Y}$ based on a preset delay time parameter t, and determining the public trapdoor T,
computing the secret trapdoor $\pi$ of the trapdoor delay function based on the public trapdoor T;
randomly selecting the generator g in the elliptic curve group $\mathbb{G}$, selecting a random value $s \in \mathbb{Z}_q^*$ as the search private key, setting search public key $h = g^s$; and
selecting three cryptographic hash functions:

$$H_1: \{0,1\}^* \to \mathcal{X}, H_2: \mathcal{Y} \to \mathbb{G}, H_3: \mathbb{G}_T \to \{0,1\}^k.$$

7. The method of claim 6, wherein building the trapdoor delay function TDF is achieved through:
according to a preset delay time parameter t, building a ring of residue classes modulo-N $\mathbb{Z}_N^*$, where N=P, Q, and P, Q are each a big prime number;
according to the delay time parameter t, determining the public trapdoor T, and computing $\varphi(N) = (P-1)(Q-1)$, then the secret trapdoor $\pi = 2^T \mod \varphi(N)$;
the trapdoor delay function TDF is denoted as: $\forall x \in \mathbb{Z}_N^*$, $TDF(x, T) = x^{2^T} \mod N \in \mathbb{Z}_N^*$ and $TDF(x, \pi) = x^\pi \mod N \in \mathbb{Z}_N^*$.

8. The method of claim 7, wherein the method further comprises randomly selecting a generator g in the elliptic curve group $\mathbb{G}$, and selecting a random value $s \in \mathbb{Z}_q^*$, setting $h = g^s$; and three cryptographic hash functions are selected: $H_1: \{0,1\}^* \to \mathcal{X}$, $H_2: \mathcal{Y} \to \mathbb{G}$, $H_3: \mathbb{G}_T \to \{0,1\}^k$.

9. The method of claim 8, wherein the method further comprises that based on the bilinear mapping e, the trapdoor delay function TDF, the generator g of the elliptic curve group $\mathbb{G}$ and the three cryptographic hash functions, the public key PK and the private key SK: PK=(q, $\mathbb{G}$, $\mathbb{G}_T$, e, g, h, TDF, T, $H_1$, $H_2$, $H_3$), SK=(s, $\pi$) are generated.

\* \* \* \* \*